United States Patent [19]

Livesay

[11] 4,339,156
[45] Jul. 13, 1982

[54] ROLLER-IDLER ASSEMBLY FOR CRAWLER UNDERCARRIAGE

[75] Inventor: Richard E. Livesay, Peoria, Ill.

[73] Assignee: Caterpillar Tractor Co., Peoria, Ill.

[21] Appl. No.: 261,113

[22] PCT Filed: Aug. 29, 1980

[86] PCT No.: PCT/US80/01118

§ 371 Date: Aug. 29, 1980

§ 102(e) Date: Aug. 29, 1980

[87] PCT Pub. No.: WO82/00810

PCT Pub. Date: Mar. 18, 1982

[51] Int. Cl.³ .................. B62D 55/10; B62D 55/30
[52] U.S. Cl. ........................................ 305/22; 305/27; 305/28
[58] Field of Search ............... 305/22, 21, 27, 28; 180/9.2 R; 474/111, 112, 117, 133, 135, 161

[56] References Cited

U.S. PATENT DOCUMENTS

| 2,315,421 | 3/1943 | Heaslet | 305/32 |
| 2,467,947 | 4/1949 | Skelton | |
| 3,826,325 | 7/1974 | Purcell et al. | 305/22 |
| 4,230,378 | 10/1980 | Purcell et al. | 305/22 |

FOREIGN PATENT DOCUMENTS

| 581279 | 7/1932 | Fed. Rep. of Germany | 305/22 |
| 842682 | 6/1939 | France | 305/22 |
| 409225 | 4/1934 | United Kingdom | 305/22 |
| 611543 | 6/1948 | United Kingdom | 305/22 |

*Primary Examiner*—David A. Scherbel
*Attorney, Agent, or Firm*—Richard F. Phillips

[57] ABSTRACT

This invention is an assembly for bogie mounting a roller (94) to an idler (88) on a crawler track undercarriage (10) such that the benefits of load transfer and shock absorbance are provided for a single roller-idler combination on a crawler track-type vehicle. A crawler track undercarriage (10) has a track frame (12) to which is pivotally mounted a support link (34) and pivotally mounted thereto a bogie link (60). Rotatably mounted on said bogie link (60) are an idler (88) and a roller (94). Variations in ground level cause the bogie link (60) to rotate such that resilient pads (98,106) are compressed thereby absorbing shock and so that the less heavily loaded of the roller (94) and the idler (88) has its loading increased. This invention also mitigates the transient loading caused by the crawler track undercarriage (10) being backed into obstacles.

12 Claims, 6 Drawing Figures

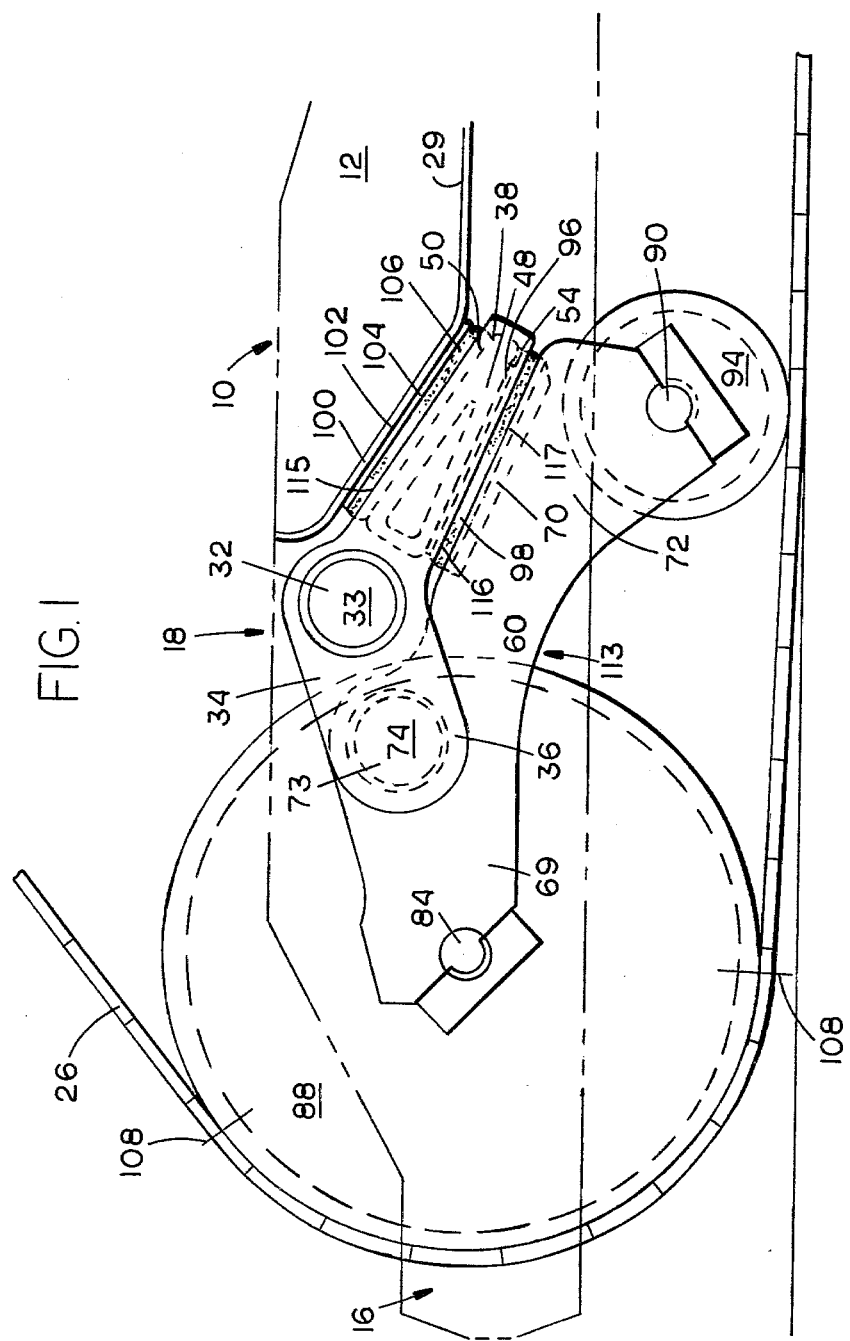

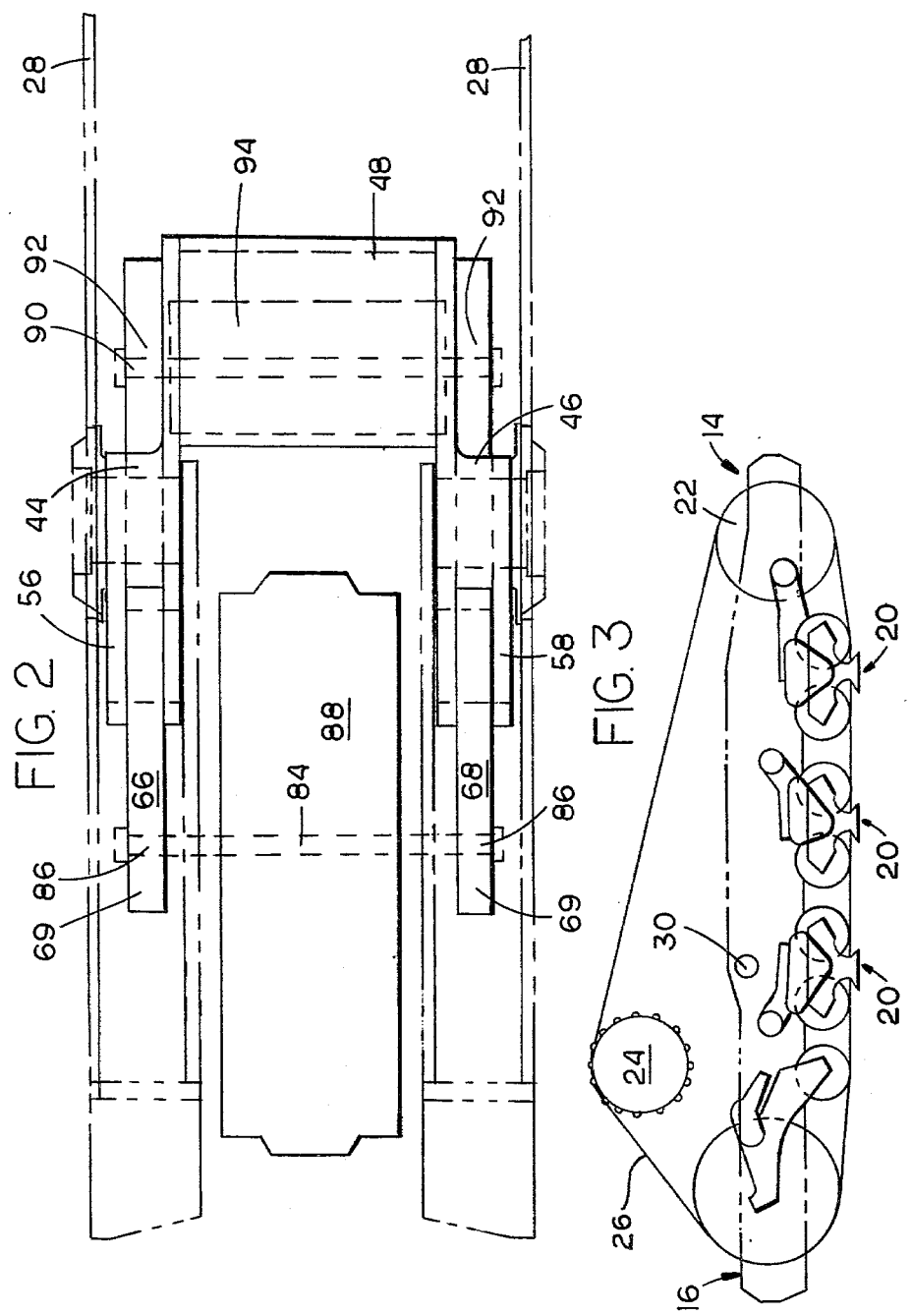

ROLLER-IDLER ASSEMBLY FOR CRAWLER UNDERCARRIAGE

DESCRIPTION

1. Technical Field

This invention relates generally to track-type tractor undercarriages and more particularly to a means for resiliently mounting on a track-type vehicle with a suspended undercarriage the rear idler and an adjacent track roller such that both are bogied adding softness to the rear of the vehicle to reduce undercarriage loads and improve the ride for the operator.

2. Background Art

Most land vehicles utilize either wheels or crawler tracks for the purpose of supporting the frame of the vehicle above the ground and for converting power into motion. Crawler tracks, which typically have a relatively great area of ground contact, are fairly rugged and can be designed to substantially conform to depressions and other irregularities in the ground. They are most commonly chosen for vehicles which will be operating where conditions are severe: deep snow, battlefields, marshy areas, heavy construction, etc.

Typically, crawler tracks include a front and a rear idler, which are freely turning wheels around which a track chain is placed; several freely turning rollers mounted between the idlers, which serve to transfer the weight of the vehicle to the ground by limiting the upward movement of the track; a track drive sprocket which serves to convert power from the engine into motion of the tracks and hence of the vehicle; and, a roller frame upon which the idlers and rollers are mounted. In some designs the drive sprocket is located at the extreme rear of the crawler track replacing one of the idlers.

The technology of crawler tractors has advanced to the point where they are reasonably reliable, durable and efficient. However, there is much yet to be done toward improving the ability of crawler undercarriage systems to absorb mechanical shocks and equalizing the pressure exerted upon the ground by each incremental length of the track in contact with it. Advancement in these areas will serve to increase the rate at which the vehicles can travel, this being currently limited in most cases by the amount of mechanical shock the vehicle and its operator can absorb. It will also serve to improve the vehicle performance in mud and other conditions where poor weight distribution across the track can result in the vehicle becoming unduly mired in the surface across which it travels.

In crawler track undercarriage systems mechanical shock is generally dealt with in two manners. The more obvious is through use of traditional shock absorbers in one form or another. In U.S. Pat. No. 1,836,446, issued Dec. 15, 1931, Christie details a system in which the rollers are rotatably mounted on an end of a connecting member another end of which is rotatably connected to the roller frame, the freedom of movement of the member and hence the roller being limited by a coil spring. A related system, using a resilient pad placed between the connecting member and a mechanical stop, is described in U.S. Pat. No. 3,774,708 issued to Purcell et al on Nov. 27, 1973. Holt, in U.S. Pat. No. 1,317,651, issued Sept. 30, 1919, teaches a similar system involving leaf springs. A combination of a leaf spring suspension for the roller-roller frame mounting and the encasement of each roller axle in a resilient material is set forth in U.S. Pat. No. 1,547,053 issued to Kegresse on July 21, 1925.

A second commonly used system for lessening the amount of shock transferred from the crawler tracks to the remainder of the vehicle is by use of some load transfer mechanism. In its simplest form this is achieved by rotatably connecting two or more rollers to a rigid member known as a bogie which is itself pivotally connected to the roller frame. When an undercarriage with bogie-mounted rollers passes over a bump, a rock for example, the bogie is caused to rotate allowing the track to deflect upward at the point overlying the rock while forcing that part of the track under the other roller connected to the bogie to move downward. In this manner the pressure exerted upon the ground by the track is reduced at points where a crawler undercarriage with non-bogied rollers would cause very great loading. Compensation is achieved through the increased loading under the other roller on the bogie. In this manner the occurrence of great variations in the load borne across the length of the track is mitigated. With such a system of ground pressure equalization the vehicle tends to bog down less often in soft materials such as snow and mud. Mechanical shocks resulting from passing over bumps, ridges, etc. are lessened as the crawler track has a certain degree of give. In addition, shock absorbing means can be incorporated into the bogie-roller frame mounting for bogied rollers. See, for example, U.S. Pat. No. 3,774,708 issued to Purcell et al on Nov. 27, 1973.

An existing difficulty in mounting the rollers on bogies is that bogies are best suited for two rollers. With three rollers on a single bogie, it is likely that one roller will often exert no pressure on the track whatsoever, for example, where the ground is perfectly level save a deep depression under one of the three rollers. With but a single roller, the bogie system is not possible. Therefore, while adequate technology exists for shockably mounting an even number of rollers on a roller frame a difficulty arises when it is necessary to include on a crawler track undercarriage an odd number of resiliently biased rollers. The addition of a single roller may be necessary, for example, to accommodate a specific length of track on the ground for a given vehicle weight. An early solution to this problem was provided by Smythe in U.S. Pat. No 1,906,116 issued Apr. 25, 1933. Smythe proposed mounting a roller and an idler on a single bogie. There was no provision, however, for any shock absorbing means other than that inherent to the bogie. Consequently, this arrangement transmitted a great deal of mechanical shock to the track frame necessitating lower speeds and strengthened vehicle components.

Christie's U.S. Pat. No. 1,836,446 issued Dec. 15, 1931, detailed supra, does describe a means of shockably mounting a single roller, but this scheme is disadvantageous in load distribution to systems using bogie mountings, and additionally would seem to be unduly expensive to produce. It is, however, no doubt feasible.

Another difficulty with existing track-type tractor undercarriages is that there is little if any provision for absorbing the shocks imposed when the rear of the crawler track undercarriage strikes a rock, a ridge, a tree or some other protruding surface in the process of backing up. As in the U.S. Pat. No. 1,906,116, the rear idler will directly transmit the resulting shock to the track roller frame resulting in the imposition of very great transient loadings. This problem was addressed in the U.S. Pat. No. 3,774,708 with a proposal for the inclusion of a pneumatic or hydraulic rear idler recoil device. The state of the art of track-type tractor undercarriages would be further improved were the rear idler provided with recoil capability in a less expensive and complicated manner.

The present invention is directed to overcoming one or more of the problems as set forth above.

DISCLOSURE OF INVENTION

In one aspect of the present invention, a track-type tractor undercarriage includes a roller and a rear idler connected by a means which causes loads on the two to be shared in a predetermined fashion. This load sharing connection means also includes additional shock absorbing means for further minimizing the effects of transient loadings.

The present invention provides a solution toward the need for a way of including on a suspended undercarriage a single roller—that is, a roller paired to no other roller—which has all the load equalizing and shock absorbing properties that are currently obtainable for paired rollers.

BRIEF DESCRIPTION OF THE DRAWINGS

FIG. 1 is a partial side view of an embodiment of the present invention;

FIG. 2 is a partial top view of FIG. 1;

FIG. 3 shows the rear idler single roller bogie incorporated into a crawler undercarriage;

BEST MODE FOR CARRYING OUT THE INVENTION

Figure 4:
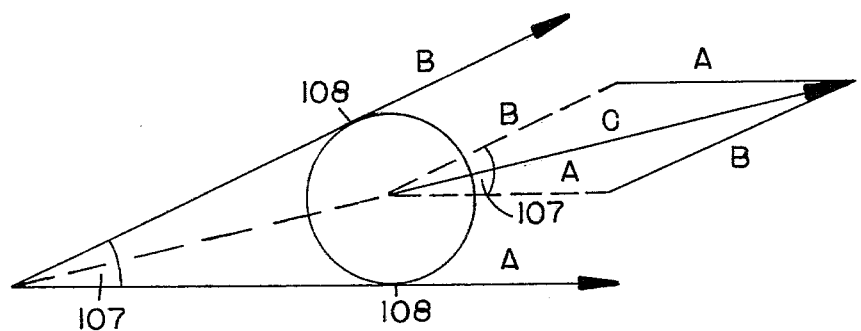
FIG. 4 shows the vector loading scheme on the rear idler.

Referring to FIGS. 1, 2, and 3, a crawler track undercarriage 10 has a track roller frame 12 with a fore section 14 and an aft section 16. This crawler track undercarriage 10 could be used on a vehicle such as a track-type tractor, battle tank, snowmobile, or any other vehicle requiring an endless track system.

Pivotally mounted on the aft section 16 of the track roller frame 12 is an idler-single roller assembly for a crawler track undercarriage, generally indicated by the FIG. 18. Several bogied roller pairs 20 pivotally attached to the frame 12, a front idler 22 rotatably mounted on the frame 12, and an elevated drive sprocket 24 positioned between the fore section 14 and aft section 16 complete a support system around which a track chain 26 is placed.

The bogied roller pairs 20 can assume many well known configurations, consequently no detailed description need be provided here. An excellent example of such an assembly is detailed in U.S. Pat. No. 3,774,708 issued to Purcell et al on Nov. 27, 1973. The idler-single roller assembly 18 can be used in combination with any number of bogied roller pairs 20.

Similarly, the track roller frame 12 can assume many well known configurations. In the instant arrangement, it is made of two rigid parallel frame plates 28 connected by numerous support members 29 for structural strength and holding the frame plates 28 in fixed, substantially parallel relationship one to the other. The track roller frame 12 is joined at a pivotal connection 30 to a vehicle main frame (not shown).

Pivotally attached at a pivotal connection 32 by axially aligned spaced apart support link pivot pins 33 to both frame plates 28, is a support link 34 having an aft end 36 and a fore end 38. The support link 34 has an inboard half 44 and an outboard half 46. These two halves 44 and 46 are rigidly joined in a parallel, spaced apart symetric relationship by a crossmember 48 having an upper face 50 and a lower face 54. The entire support link 34 is located and pivotable within the two frame plates 28 with only the pivot pins 33 extending through the frame plates 28. The aft ends 36 of the two halves 44 and 46 of the support link 34 have bifurcations 56 and 58, respectively.

A bogie link assembly 60 has an inner arm 66 and an outer arm 68, each having an aft end 69, rigidly joined in a parallel, spaced apart symmetrical relationship by an upper bogie plate 70 situated between upper fore ends 72 of the two arms, 66 and 68. The bogie link arms 66 and 68 are pivotally connected at a pivotal connection 73 intermediate their ends to support link 34 bogie link pins 74 passing through the bifurcations 56 and 58 of support link halves 44 and 46, respectively.

For the purposes of this description and in the appended claims the terms "fore" and "aft" when used in reference to the various portions of the support link 34 and the bogie link assembly 60 do not necessarily coincide with the use of the terms "fore" and "aft" when used in reference to the track roller frame 12 or the vehicle. For example, in that embodiment of the present roller-idler assembly which is adapted for use at the track roller frame fore section 14, the support link and bogie link aft ends 36,69 are relatively nearer the track roller frame fore section 14 than are the support link and bogie link fore ends 38,72.

Rotatably mounted on an idler axle 84 running between an aftmost position 86 on the inner bogie arm 66 to an aftmost position 86 on the outer arm 68 is an idler 88.

Rotatably mounted on a roller axle 90 running between a foremost position 92 on the inner bogie arm 66 and a foremost position 92 on the outer bogie arm 68 is a track roller 94.

Removably attached to substantially the entirety of the lower face 54 of the crossmember 48 of the support link 34 is a resilient sheet 96 made of rubber or an equivalent. Attached to the upper bogie plate 70 is a compressible suspension pad 98 made of rubber or some other resilient material. This suspension pad and all others used in the present invention must be capable of repeatedly sustaining a loading of at least several tons without suffering any significant degradation of its resiliency. Such suspension pads are well known in the art.

On track roller frame 12 and substantially parallel to the crossmember upper face 50 when in its steady state operating position (that is, its location when there is constant vehicle velocity on a level, smooth surface) and upwardly located a spaced distance therefrom is a support link stop 100 having a lower face 102. This is a rigid plate perpendicular to and running between the frame plates 28. Removably attached to the lower face 102 of support member 100 is a thin sheet of resilient material 104 such as rubber. Attached to the crossmember upper face 50 is a suspension pad 106 similar to the support link suspension pad 98.

In the preferred embodiment of this invention the components of the rear idler-single roller assembly 18 must be so sized and aligned that in steady state operation of a vehicle including a crawler track 10 with such an assembly, the track chain 26 will be elevated a spaced distance above the ground at the point it contacts the lowest point on the idler 88. The resiliency and size of the suspension pads 98 and 106 must be such that they effectively absorb shocks and sufficiently deform so as to permit adequate bogie action of the roller 94-idler 88 combination to allow adequate load transfer away from whichever of the two is overloaded.

In the best mode for carrying out this invention the axes of the bogie link pivotal connection 73, the support link pivotal connection 32, and the idler axle 84 are to be coplanar. Additionally, this plane must bisect an angle 107 formed by tangents to the idler 88 at the boundaries of the track 26 and idler 88 contact. Referring to FIG. 4, these are at points 108. With such a geometry all nontransient loads imposed on the idler 88 due to chain tension will be borne by the frame at pivot pin 32 with substantially no loading either of suspension pad 98 or of suspension pad 106. Referring to FIG. 4, the loading that the track chain 26 imposes on the idler 88 may be represented by the load vectors A and B tangent to the idler 88 at the boundaries of track-idler contact 108. It is axiomatic that in a nontransient situation the magnitude of vectors A and B are substantially equal, consequently their resultant, or vector sum, is a vector C bisecting the angle 107 between vectors A and B, vector C consequently being perpendicular to and passing through each of the axes of the bogie link pin 82, the support link pin 34, and the idler pin 90.

Industrial Applicability

The idler-single roller assembly 18 is suited for incorporation in the crawler track undercarriage 10 of any track-type vehicle. As adequate technology exists for bogie mounted roller pairs 20 of a shock absorbing nature the idler-single roller bogie 18 is used to greatest advantage in a crawler track undercarriage 10 which must include a roller 94 which cannot be bogie mounted to any other roller 110 and which must be shock absorbingly mounted.

Neglecting gravitational and frictional forces, substantially every appreciable force which the rear idler-single roller assembly 18 must sustain will enter the system by acting on the track chain 26. The track chain 26 contacts the rear idler-single roller assembly 18 only at portions of the periphery of the roller 94 and the idler 88 as shown in FIGS. 1 and 3, consequently all external forces acting on the rear idler-single roller assembly 18 enter via the roller 94 and the idler 88. As the roller 94 and the idler 88 each have but a single connection with remainder of the crawler track undercarriage 10, the roller axle 90 and the idler axle 84, respectively, the forces acting on the system may be considered to act through these connections.

Consider the case in which no forces whatsoever act on the crawler track 10. For the purposes of example all shock absorbing elements will be deemed to be in their lowest energy state, springs neither in compression or tension, and all resilient pads, including the suspension pads 98 and 106, will be in contact with but not compressed against their respective stops. Under these conditions the lowest points of each roller 94,110 will be substantially coplanar; however, in the best embodiment of the present invention the lowest point on the idler 88 will be vertically removed a distance above this plane.

Placing the crawler track undercarriage 10 under consideration and a vehicle to which it is connected (not shown) on a flat, level surface, the weight of the vehicle (not shown) will be borne through the track chain 26 by the rollers 94,110. The magnitude of the load carried by the single roller 94 incorporated in this invention is determined by the weight and weight distribution of the vehicle (not shown) as well as by the number and position of the other rollers 110 in the crawler track undercarriage 10. The load borne by the roller 94 incorporated in the idler-single roller assembly 18 will act upward through the roller axle 90 causing compression of the suspension pads 106 and 98. Consequently, the load passes from the track roller frame 12 to the ground as, of course, it must. The compression of the suspension pads 106 and 98 results in a realignment of the components of the idler-single roller assembly 18. The compression of the track frame suspension pad 106 causes the support link fore end 38 to rotate upward about the support link pivot pins 33 causing the support link aft end 36 to rotate downward lowering the position of the idler axle 84 and consequently of the idler 88 itself. The compression of the support link suspension pad 98 causes the bogie link fore end 72 to rotate upward about the bogie link pins 74 resulting in downward rotation of the bogie link aft end 69 resulting in further downward movement of the idler 88. As a consequence of placing the vehicle (not shown) on the ground, the idler 88 moves to a position nearer the plane of the lowest points on the rollers 94,110. As is well known in the art, it is important that in this position, or in steady state operation, the lowest point of the idler 88 be at a higher elevation than the lowest point of the rollers 94,110. This is achieved by matching the size and alignment of the bogie link 60 and support link 34 and the size and resiliency of the suspension pads 98 and 106 to the loadings anticipated for the roller 94—idler 88 combination.

Figure 5:
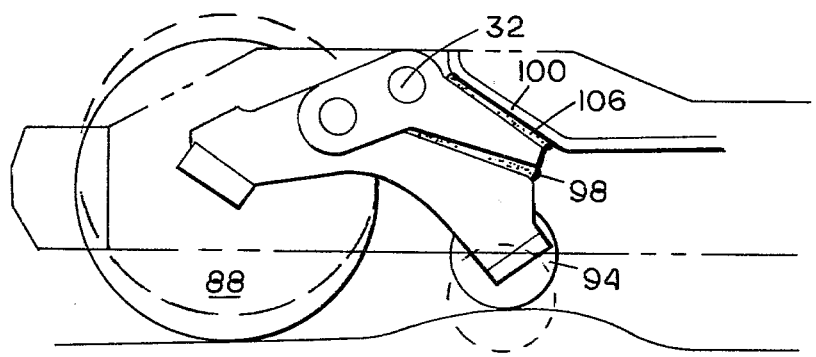
FIG. 5 shows the action of the invention when a bump passes under the single roller.
Figure 6:
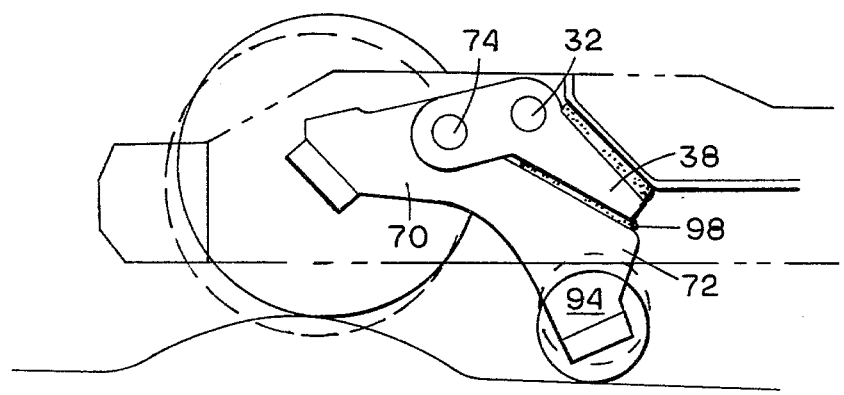
FIG. 6 shows the action of the invention when an elevated area passes beneath the idler.

A prime feature of the present invention is its provision of load distribution. As is shown in FIG. 5, should the rear roller 94 pass over a bump the loading it undergoes is increased. This increased loading causes further compression of both suspension pads 98,106 as described above resulting in further downward movement of the idler 88. This further downward movement will be in many cases sufficient to bring the idler 88 in contact with the ground thereby shifting a portion of the load to the idler 88. In this situation the bulk of the load will be borne by the track frame 12 at the support member stop 100 and some smaller portion, owing to that portion of the load transferred to the idler 88, by the support link pivotal connection 32.

For the instance in which the idler 88 passes over a projection it becomes disproportionately loaded causing upward rotation of the bogie link aft end 69 bringing about downward rotation of the bogie link fore end 72 and, consequently, downward movement of the roller 94. The roller 94 will either contact the ground or move downward sufficiently to take slack out of the track 26 and thereby become loaded. In either case, the single roller 94 will be loaded causing a load to be imposed on the bogie link pin 74 resulting in downward rotation of the support link fore end 38 causing the support link suspension pad 98 to be compressed in a scissors-like action. In this case the load is borne by the track frame 12 at the support link pivot pin 32.

In the case in which conditions are such that the roller 94 and the idler 88 are substantially equally loaded the track frame 12 absorbs the load in a combination of the two manners set forth above.

As opposed to a rigidly mounted odd roller, the present invention provides smoother operation, that is, greatly decreased transient loadings, of the vehicle 112 to which it is attached owing to its shock absorbing characteristics. In addition, the load which the crawler track undercarriage 10 must support is more evenly distributed across that portion of the track chain 26 which is in proximity with the idler-single roller assembly 18 thereby decreasing the extent to which bogging down in materials such as mud and snow can occur.

As the invention described herein contains no element, for the case of the rear idler-single roller assembly 18, extending forward of the roller 94 or aft of the idler 88 it is quite space efficient and can be incorporated into existing crawler track designs to provide an additional roller. In most cases this will involve no more than a minor increase in crawler track undercarriage 10 length. The addition of this extra roller 94 will provide a lower ground pressure crawler track undercarriage 10 of a totally suspended nature without the expense and undue length an additional full double roller bogie would entail.

While the best embodiment envisioned for the present invention is a crawler track undercarriage 10 including a single roller-rear idler assembly 18, other uses are possible. For example, it might be advantageous in certain applications to include a single roller idler bogie at the front rather than the rear of a crawler track undercarriage 10. Likewise, it might be desired to include both a front and rear single roller-idler assembly 18 on a single crawler track undercarriage 10.

Further aspects, objects, advantages, and uses of this invention can be obtained from a study of the drawings, the disclosure, and the appended claims. It should be understood that the idler-single roller assembly 18 can assume many other configurations without departing from the claims.

I claim:

1. A mounting assembly (113) for an idler (88) and a roller (94) of an endless track vehicle having a track roller frame (12) comprising:
   a support link (34) having an aft end (36) and a fore end (38) pivotally connected at a support link pivotal connection (32) intermediate its ends (36,38) to said frame (12);
   means (100) for limiting upward rotation of the support link fore end (38);
   a bogie link (60) having an aft end (69) on which is mounted said idler (88) by an idler axle (84) and a fore end (72) rotatably mounting said roller (94) said bogie link (60) being pivotally connected intermediate its ends (69,72) to the aft end (36) of said support link (34) at a bogie link pivotal connection (73); and
   means (48,70,98) interposed between the fore end (38) of said support link (34) and the fore end (72) of said bogie link (60) for resiliently cushioning upward movement of said roller (94) and downward movement of said idler (88).

2. A roller (94)-idler (88) mounting assembly (113) for a crawler track undercarriage (10) having a track roller frame (12) with a fore section (14) and an aft section (16), a front idler (22) rotatably mounted to said fore section (14), an idler (88) mounted to said aft section (16), a plurality of bogied roller pairs (20) spaced along the bottom of said track roller frame (12), and a drive sprocket (24) engaging a track chain (26) which is placed so as to surround said rollers (94,20), idlers (22,88) and drive sprocket (24) wherein the improvement comprises:
   a rigid support link (34), having an aft end (36) and a fore end (38) which itself has an upper surface (115) and a lower surface (116), which is pivotally connected by a support link pivot pin (32) intermediate its ends (36,38) to an aft section (16) of said track roller frame (12);
   a rigid bogie link (60) having an aft end (69) and a fore end (72) which itself has an upper surface (117), pivotally connected intermediate its ends (69,72) by at least one bogie link pin (74) to the support link aft end (36) such that the support link fore end (38) is positioned a vertical distance above the bogie link fore end (72);
   the idler (88) being rotatably connected by an idler axle (84) to the bogie link aft end (69);
   the roller (94) being rotatably connected to the bogie link fore end (72);
   means (100) for preventing upward rotation of the support link fore end (38) beyond a preselected point; and
   means (48,70,98) for resiliently resisting, beyong a preselected separation, decreasing separation of the support link fore end (38) and the bogie link fore end (72).

3. The mounting assembly (113) as set forth in claim 1 or claim 2 wherein said upward rotation limiting means (100) is a support link stop (100) rigidly attached to said track roller frame (12).

4. The mounting assembly (113) as set forth in claim 3 further comprising a means (106) for resiliently resisting motion of the support link fore end (38) toward said support link stop (100).

5. The mounting assembly (113) as set forth in claim 4 having a track chain (26) passing under said roller (94) and partially around said idler (88), such that there are two boundaries of track-idler contact (108), wherein said bogie link pivotal connection (73) and said support link pivotal connection (37) and said idler axle (84) all lie substantially on a plane bisecting an angle (107) formed by tangents to said idler (88) at said two boundaries of track-idler contact (108).

6. The mounting assembly (113) as set forth in claim 5 wherein said bogie link (60), support link (34) and said two resilient resisting means (48,70,98,106) are so sized and situated that when said endless track vehicle (112) operates at a constant velocity on a level, smooth surface that portion of said track chain (26) in contact with said idler (88) is not in contact with said surface.

7. The mounting assembly (113) as set forth in claim 6 wherein said support link (34), said two resilient resisting means (48,70,98,106), and said bogie link (60) are substantially symmetrically duplicated about a longitudinal vertical plane bisecting said crawler track (10), roller (94), and idler (88).

8. A crawler track undercarriage (10) as set forth in claim 7, wherein said symmetrically disposed bogie links (60) are rigidly joined by an upper bogie plate (70) situated between the bogie link upper fore surfaces (72).

9. A crawler track undercarriage (10) as set forth in claim 8, wherein said symmetrically disposed support link (34) has an inboard half (44) and an outboard half (46) rigidly joined by a crossmember (48) situated between the support link inboard half (44) and the support link outboard half (46).

10. A crawler track undercarriage (10) as set forth in claim 9, wherein said means (106) for resiliently resisting upward rotation of the support link fore end (38) comprises:

a support member stop (100) passing across said track frame (12) so as to prevent motion of said support member (29) beyond a preselected point; and a compressible track frame suspension pad (106) fixedly attached to said support member stop (100) such that upward rotation of the support link fore end (38) forces said crossmember (48) into contact with said track frame suspension pad (106).

11. A crawler track undercarriage (10) as set forth in claim 10, wherein said means for resiliently resisting upward rotation of the bogie link fore end (72) against the support link fore end lower surface (116) comprises a compressible support link suspension pad (98) fixedly attached to said crossmember (48) such that upward rotation of the bogie link fore end (72) forces it into contact with said support link suspension pad (98).

12. A mounting assembly (113) for an idler (88) and a roller (94) of an endless track vehicle having a track roller frame (12) comprising:

a support link (34) having an aft end (36) and a fore end (38) pivotally connected at a support link pivotal connection (32) intermediate its ends (36,38) to said frame (12);

means (100) for limiting upward rotation of the support link fore end (38);

a bogie link (60) having an aft end (69) on which is mounted said idler (88) by an idler axle (84) and a fore end (72) rotatably mounting said roller (94), said bogie link (60) being pivotally connected intermediate its ends (69,72) to the aft end (36) of said support link (34) at a bogie link pivotal connection (73); and means (98) interposed between the fore end (38) of said support link (34) and the fore end (72) of said bogie link (60) for resiliently cushioning upward movement of said roller (94) and downward movement of said idler (88).

* * * * *

Disclaimer

4,339,156.—*Richard E. Livesay*, Peoria, Ill., ROLLER-IDLER ASSEMBLY FOR CRAWLER UNDERCARRIAGE. Patent dated July 13, 1982. Disclaimer filed Aug. 23, 1982, by the assignee, *Caterpillar Tractor Co.*

Hereby enters this disclaimer to claim 12 of said patent.
[*Official Gazette October 26, 1982.*]